United States Patent [19]

Tanaka

[11] Patent Number: 4,527,154

[45] Date of Patent: Jul. 2, 1985

[54] DISPLAY SYSTEM

[75] Inventor: Kazuyuki Tanaka, Kamakura, Japan

[73] Assignee: Matsushita Electric Industrial Co. Ltd., Osaka, Japan

[21] Appl. No.: 331,818

[22] Filed: Dec. 17, 1981

[30] Foreign Application Priority Data

Dec. 26, 1980 [JP] Japan ............................... 55-186398

[51] Int. Cl.[3] ............................................ G06F 3/14

[52] U.S. Cl. .................................... 340/221; 340/748

[58] Field of Search ................ 340/721, 724, 792, 726

[56] References Cited

U.S. PATENT DOCUMENTS 4,323,892 4/1982 Kinghorn ............................ 340/724

4,342,990 8/1982 Traster ............................... 340/724

4,342,991 8/1982 Pope et al. .......................... 340/792

*Primary Examiner*—David L. Trafton

*Attorney, Agent, or Firm*—Stevens, Davis Miller & Mosher

[57] ABSTRACT

In a display system including a screen memory having a one-to-one correspondence to the characters to be displayed on a cathode ray tube or CRT, a character generator for generating a bit stream indicative of a character selected by an output of the screen memory and a CRT control circuit for generating the display addresses corresponding to the display positions on the CRT and the raster addresses for selecting the relation between the character block of the character generator and the scanning lines of the characters to be displayed on the CRT, the characters to be displayed on the CRT are vertically shifted in accordance with the value of the display addresses and a separating line is displayed in the space provided by the shifting of the characters thereby making the vertically shifted lines easy to see.

3 Claims, 10 Drawing Figures

DISPLAY SYSTEM

BACKGROUND OF THE INVENTION

The present invention relates to a display system comprising a screen memory having a one-to-one correspondence to the characters to be displayed on a raster scan type cathode ray tube, a character generator for generating a bit stream indicative of a character selected by an output of the screen memory and a CRT control circuit for generating a display address corresponding to a display position on the CRT and raster addresses which select the relation between the character block of the character generator and the scanning lines of the characters to be displayed on the CRT.

FIGS. *4a* and *4b* show the display made in the prior art system in which the screen memory has a single-line portion thereof allocated for status line displaying purposes.

Figure 5:
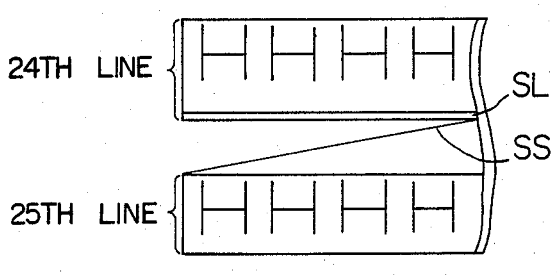
PRIOR ART FIG. 5

FIG. 5 shows the display made by another prior art system employing a skip scan.

Figure 6:
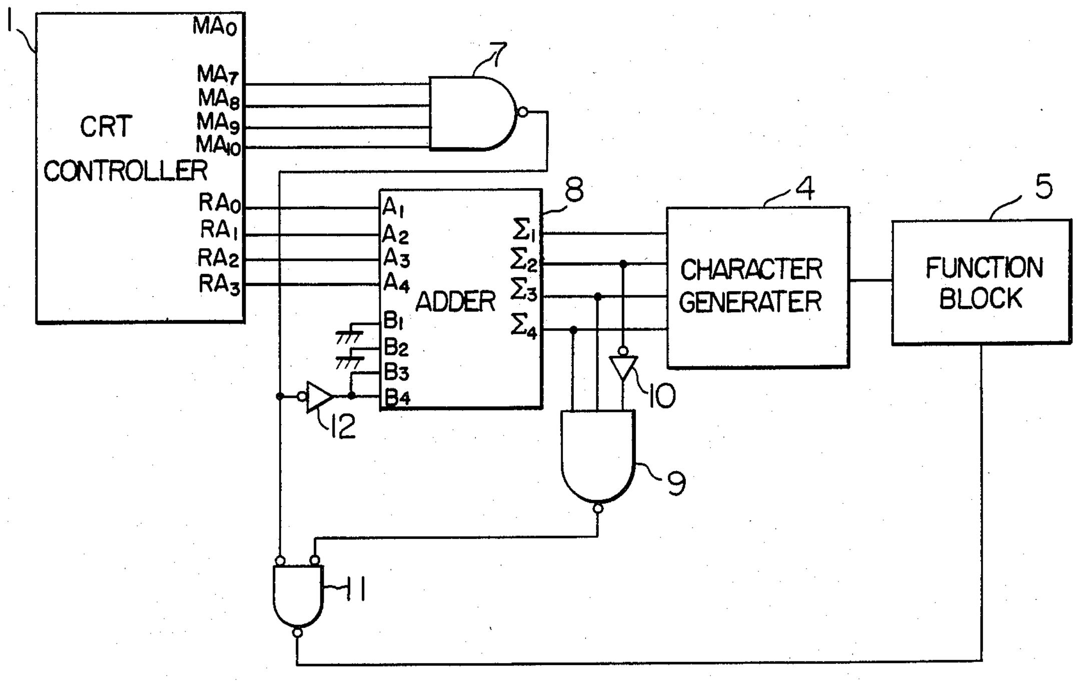

FIG. 6 is a circuit diagram of a display system according to an embodiment of the present invention.

FIGS. *7a* and *7b* show comparatively the displays made on the screen by the prior art system and the system of this invention, respectively.

Figure 8:
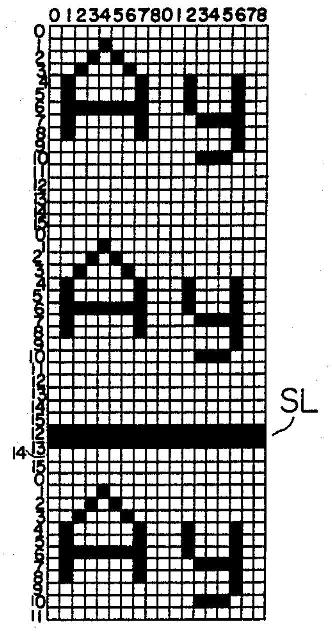

FIG. 8 shows the display of the status line and the characters in the 25th line in accordance with the present invention.

DESCRIPTION OF THE PRIOR ART

Figure 1:
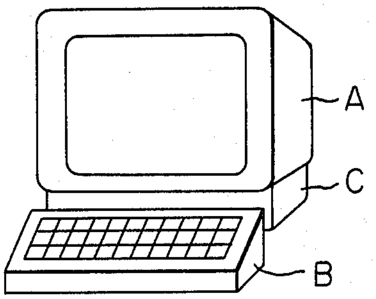
FIG. 1 is a perspective view showing the external appearance of a display system incorporating the present invention.
Figure 4A:
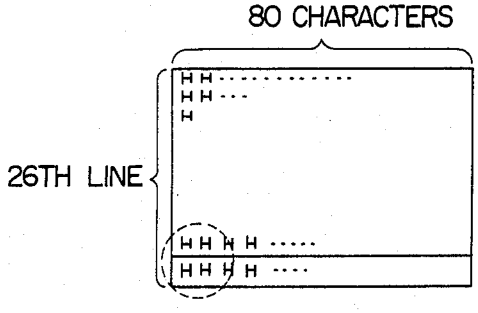
PRIOR ART FIG. 4a
Figure 2:
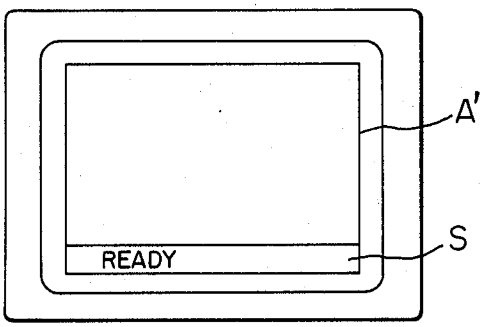
FIG. 2 is a view showing by way of example a display on the CRT.
Figure 4B:
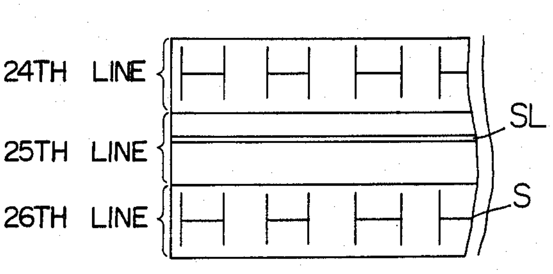
PRIOR ART FIG. 4b

In a prior art CRT terminal device comprising a raster scan type CRT monitor A and a keyboard B as shown in FIG. 1, as shown in FIG. 2, there is sometimes provided a status display line S for indicating the operating status of the CRT terminal device. In FIG. 2, designated at A′ is the screen displayed on the face of the CRT A.

Figure 3:
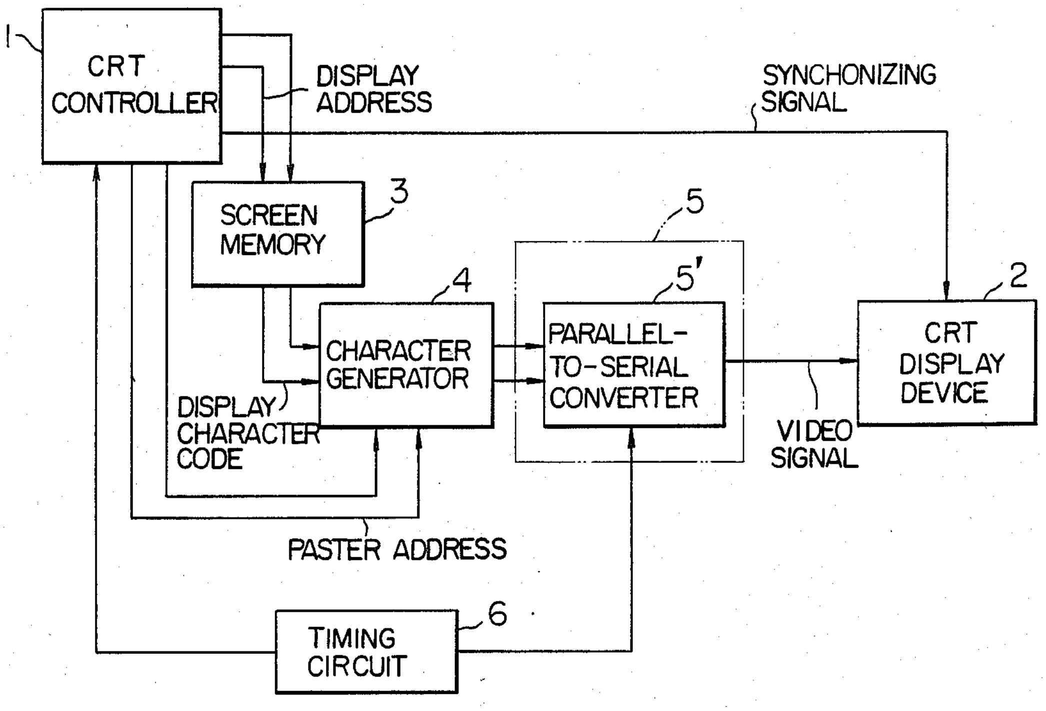
PRIOR ART FIG. 3
FIG. 3 is a block diagram showing the basic circuit construction of a prior art display system.

FIG. 3 illustrates a block diagram showing the basic construction of the prior art CRT terminal equipment. In the Figure, numeral 1 designates a CRT controller for generating the display addresses corresponding to the display positions on a CRT screen, the raster addresses corresponding to the raster order of a character generator 4 and the horizontal and vertical synchronizing signals for a CRT display device 2. Numeral 3 designates a screen memory for generating a display character code corresponding to the display address generated from the CRT controller 1 and applying the same to the character generator 4. The character generator 4 is responsive to the raster addresses generated from the CRT controller 1 to successively apply the corresponding character data to a parallel-to-serial converter 5′ for displaying the character corresponding to the display character code on the CRT. The parallel-to-serial converter 5′ is responsive to the clock applied from a timing circuit 6 to effect a parallel-to-serial conversion of the character data and apply it as a video signal to the CRT display device 2.

With this type of CRT terminal equipment, a status display line S is frequently provided as the lowermost line of the CRT screen to indicate the operating status of the CRT terminal device as mentioned previously, and in order to separate the status display line S from a data display area for displaying the data sent from a host computer or the like, a separating line or a status line SL will also be displayed between the two in certain cases as shown in FIG. *4b*. The means for displaying the status line SL include: (1) the method in which the screen memory has its part corresponding to one line allocated for status line SL displaying purposes and the status line SL is displayed as a sort of character pattern as shown in FIGS. *4a* and *4b*, and (2) the method in which an address detecting circuit is connected to the display address output terminals of the CRT controller so as to detect the display position of the status line SL so that the status line SL is displayed in accordance with the output from the address detecting circuit and also a skip scan signal is applied to the vertical deflection plate system of the CRT display device so that a status line and a space line are interposed by a skip scan SS between the data display area and the status display line as shown in FIG. 5. However, the method (1) has the disadvantage of requiring an additional screen memory capacity for one line for status line displaying purposes. The method (2) has the disadvantage of requiring the use of a special skip scan type for the CRT display device.

SUMMARY OF THE INVENTION

It is the primary object of the present invention to provide an inexpensive display system so designed that the characters to be displayed on a cathode ray tube (hereinafter referred to as a CRT) are displayed by changing the order of raster addresses for a character generator so as to vary the vertical space between the characters as desired and also to display a separating line in the space, thereby overcoming the foregoing deficiencies of the prior art.

DESCRIPTION OF THE PREFERRED EMBODIMENT

Figure 7A:
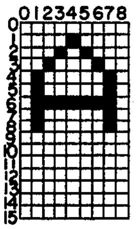
PRIOR ART FIG. 7a
Figure 7B:
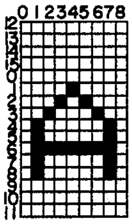

A preferred embodiment of the present invention will now be described with reference to FIGS. 6 to 8.

FIG. 6 illustrates a main circuit construction of the display system according to the invention. In the figure, numeral 1 designates the previously mentioned CRT controller, and 7 a gate whose output signal goes to a low level when $MA_7$ to $MA_{10}$ of an output display address (MA) from the CRT controller 1 go to a high level. This means that if the display addresses begin at 0, in the case of the display device designed to display 80 characters horizontally the first display address for the 25th line is $80\times24=1920$ which can be converted to 11110000000 in binary form. In order words, the $MA_7$ to $MA_{10}$ all go to "1" and thus the output of the gate 7 goes to the low level when the 25th line is reached. Numeral 8 designates a 4-bit binary adder for adding a raster address (RA) generated from the CRT controller 1 to a constant determined by the output of the gate 7. Numerals 9 and 10 designate a gate group so designed that the output of the gate 9 goes to the low level when outputs $\Sigma_2$ to $\Sigma_4$ of the adder 8 become 011. Numeral 11 designates a gate which performs the OR operation on the outputs from the gates 9 and 11 so that its output goes to the low level when the 25th line is reached and the raster address (RA) is 1100 or 1101. Numeral 12 designates an inverter.

With the construction described above, the operation of the circuitry will now be described. Note that in this case each character block has a 9×16 format. The operation will be described first with reference to a case where the line to be displayed is not the 25th line. In this case, the output of the 25th line detecting gate 7 connected to the display address output terminals of the CRT controller 1 goes to the high level and thus the output of the inverter 12 goes to the low level. As a result, the value at inputs $B_1$ to $B_4$ of the adder 8 becomes 0 and the raster address $RA_0$ to $RA_3$ from the CRT controller 1 appears as such at the outputs $\Sigma_1$ to $\Sigma_4$ of the adder 8 and it is then applied to the raster address input terminals of the character generator 4. On the other hand, when the line to be displayed is the 25th line, the output of the gate 7 now goes to the low level so that the output of the inverter 12 goes to the high level. As a result, the value of the inputs $B_1$ to $B_4$ become 0011 (binary) and the value of $B_1$ to $B_4$ or 12 (decimal) is added to the value at the other inputs $A_1$ to $A_4$, thus generating the remainder with respect to 16 at the outputs $\Sigma_1$ to $\Sigma_4$. In other words, the decimal value 12 is added to the value of the raster address $RA_0$ to $RA_3$ and the remainder with respect to 16 is applied to the raster address input terminals of the character generator 4. The resulting character display on the screen will now be described in greater detail with reference to FIGS. *7a* and *7b*.

FIG. *7a* shows the display of the letter A in the alphabet when the display position is not in the 25th line. FIG. *7b* shows the display of the letter A when the display position is in the 25th line. Returning to the description of the main circuitry of FIG. 6, the inverter 10 and the gate 9 are so designed that the output of the gate 9 goes to the low level when the raster address of 12 (or 1100) or 13 (or 1101) is applied to the raster address input terminals of the character generator 4 as mentioned previously. Thus, the gate 11 generates an output indicative of the logical product (negative logic) of the outputs from the gate 9 and the 25th line detecting gate 7. The output of the gate 11 goes to the low level when the 25th line is to be displayed and the raster address applied to the raster address input terminals of the character generator 4 represents 12 or 13. In FIG. 6, numeral 5 designates a function block for effecting a parallel-to-serial conversion of the output data from the character generator 4 and for displaying the status line SL when the output of the gate 11 goes to the low level and the block comprises a shift register and gates. FIG. 8 shows the status display line and the display of the status line SL effected by the construction of FIG. 6.

In other words, FIG. 8 shows the display on the CRT screen in which the letters A and y were displayed in the 23rd, 24th and 25th lines, respectively. While the raster addresses were started from the position 0 in the 23rd and 24th lines, in the 25th line the raster addresses were started from the position 12 by virtue of the circuitry shown in FIG. 6. The display also shows the manner in which the status line SL was displayed by means of the signals generated from the gates 9, 10 and 11 in FIG. 6.

The invention has been described so far with reference to its preferred embodiment and the invention has among its advantages the fact that the CRT display device needs not to be provided with any special deflection function (the skip scan is not required) and also there is no need to allocate any part of the screen memory for status line displaying purposes with the resulting decrease in the capacity of the screen memory. It is to be noted that the adder of FIG. 6 can be replaced with a subtractor to produce the similar effect.

Further, the adder of FIG. 6 may for example be replaced with a circuit employing an ROM (read-only memory) such that the address terminals of the ROM are connected to the raster address outputs of the CRT controller 1 and the output of the gate 7 in the same Figure is connected to another address terminals of the ROM which is in turn connected to the character generator 4. With this construction employing the ROM, the sequence of raster addresses applied to the character generator 4 can be determined as desired in accordance with the sequences preliminarily written into the ROM.

Further, by replacing the gate 7 of FIG. 6 with a circuit for detecting a given display address, it is possible to vary the raster addresses of the characters at given display positions.

I claim:

1. A display system comprising:

a screen memory having a one-to-one correspondence to characters to be displayed on a raster scan type CRT;

a character generator for generating a bit stream indicative of a character selected by an output from said screen memory;

a CRT control circuit for generating display addresses each corresponding to one of the display positions on said CRT and a raster addresses for selecting the relation between a character block of said character generator and the scanning lines of characters to be displayed on said CRT, each said display address being coupled to said screen memory;

a raster address shifting circuit for shifting said raster addresses by a predetermined numerical amount to provide output address signals to said character generator;

a display address detection circuit for receiving said display addresses from said CRT control circuit to provide a display address detection signal to said shifting circuit, so that the order of raster addresses applied to said character generator by said shifting circuit is varied in accordance with the display address detection signal of said display address detection circuit; and a raster address detection circuit for receiving the output address signals from said shifting circuit, and a gate circuit for receiving a raster address detection signal from said raster address detection circuit and the display address detection signal from said display address detection circuit to provide a gate signal indicative of a status line to said CRT.

2. A display system according to claim 1 wherein said shifting circuit is an adder circuit which adds a predetermined numerical amount to said raster addresses.

3. A display system according to claim 1 wherein said shifting circuit is a subtractor circuit which subtracts a predetermined numerical amount from said raster addresses.

* * * * *